(12) United States Patent
Hobson

(10) Patent No.: US 7,430,502 B2
(45) Date of Patent: Sep. 30, 2008

(54) USING THERMAL MANAGEMENT REGISTER TO SIMULATE PROCESSOR PERFORMANCE STATES

(75) Inventor: Louis B. Hobson, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 601 days.

(21) Appl. No.: 10/812,147

(22) Filed: Mar. 29, 2004

(65) Prior Publication Data

US 2005/0216245 A1    Sep. 29, 2005

(51) Int. Cl.
*G06F 17/50*   (2006.01)
*G06F 1/00*    (2006.01)
*G06F 1/26*    (2006.01)
*G05B 13/02*   (2006.01)
*G05B 9/02*    (2006.01)
*G05D 3/12*    (2006.01)
*G05D 23/00*   (2006.01)

(52) U.S. Cl. ............... 703/15; 700/44; 700/79; 700/291; 700/299; 702/132; 703/21; 713/300; 713/322

(58) Field of Classification Search ............ 703/16, 703/13, 14, 15, 17, 21, 22; 700/28, 44, 79, 700/291, 292, 295, 297, 298, 299; 702/127, 702/132; 710/44; 713/300, 320, 321, 322, 713/323
See application file for complete search history.

(56) References Cited

U.S. PATENT DOCUMENTS

| | | | | |
|---|---|---|---|---|
| 6,167,330 | A * | 12/2000 | Linderman | 700/295 |
| 6,172,611 | B1 * | 1/2001 | Hussain et al. | 340/584 |
| 6,457,135 | B1 * | 9/2002 | Cooper | 713/323 |
| 6,470,289 | B1 * | 10/2002 | Peters et al. | 702/132 |
| 6,535,798 | B1 * | 3/2003 | Bhatia et al. | 700/293 |
| 6,980,944 | B1 * | 12/2005 | Oshins et al. | 703/17 |
| 6,996,441 | B1 * | 2/2006 | Tobias | 700/44 |
| 7,034,556 | B1 * | 4/2006 | Arlow | 324/760 |
| 7,082,542 | B2 * | 7/2006 | Cooper | 713/320 |
| 7,228,242 | B2 * | 6/2007 | Read et al. | 702/57 |
| 2005/0188263 | A1 * | 8/2005 | Gross et al. | 714/25 |

* cited by examiner

*Primary Examiner*—Tonia L. M. Dollinger
*Assistant Examiner*—Jonathan R Plante

(57) ABSTRACT

Systems, methodologies, media, and other embodiments associated with simulating a processor performance state by controlling a thermal management signal are described. One exemplary system embodiment includes a data structure for storing bit patterns that facilitate controlling a GPIO (General Purpose Input Output) block and addresses of locations to which the bit patterns can be written. The example system may also include a logic configured to receive a request to produce a performance state in a processor and to cause a frequency and voltage to be established in the processor in response to a thermal management signal being generated in response to writing the bit pattern(s) to the address(es).

11 Claims, 8 Drawing Sheets

Prior Art Figure 1

USING THERMAL MANAGEMENT REGISTER TO SIMULATE PROCESSOR PERFORMANCE STATES

BACKGROUND

Microprocessors produce heat when operating. The amount of heat is directly proportional to the operating frequency and voltage employed by the microprocessor. Thus, some systems attempt to manage heat production by selectively controlling processor frequency and voltage. The Advanced Configuration and Power Interface (ACPI) standard was produced in part to address challenges associated with thermal management and to facilitate controlling processor frequency and voltage via processor performance states. The ACPI specification facilitates standardizing how an operating system can monitor system usage and/or temperature and then react to various conditions by changing a processor performance state. These processor performance states have typically been available in laptop systems and not in desktop systems.

A processor performance state may specify a frequency and voltage at which a processor is to operate. To facilitate implementing a processor performance state, a processor may include an internal machine specific register (MSR) that can be programmed to control the frequency and voltage associated with a processor performance state. Additionally, a microprocessor may include hardware specifically allocated for an emergency response to an overheated condition. For example, an Intel® Pentium® 4 processor includes a thermal management register (TM2) that can be employed to facilitate controlling temperature. Conventionally, the TM2 register is accessed in response to a processor overheated (PROCHOT) signal being asserted on a line (e.g., PROCHOT line) available to the processor. The PROCHOT signal is typically generated by a thermal management circuit in response to detecting a thermal condition (e.g., overheated). For example, Prior Art FIG. 1 illustrates an example circuit that can be employed to trigger the PROCHOT signal when a processor is overheating.

BRIEF DESCRIPTION OF THE DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

Prior Art

DETAILED DESCRIPTION

Figure 1:
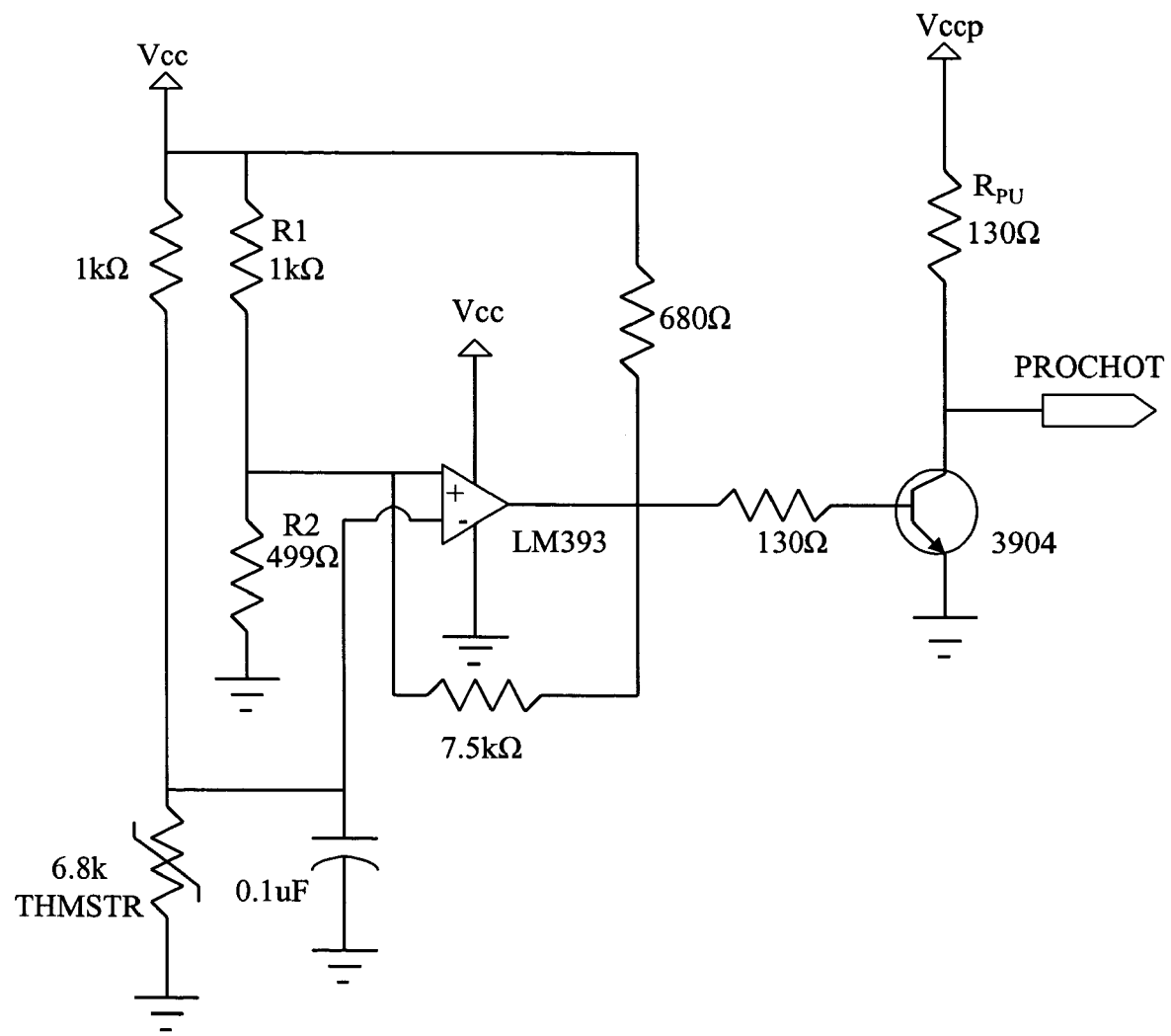
FIG. 1 illustrates an example thermal management circuit for generating a processor overheated (PROCHOT) signal.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer communication", as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data. A computer-readable medium may take forms, including, but not limited to, non-volatile media and volatile media. Non-volatile media may include, for example, optical or magnetic disks and so on. Volatile media may include, for example, optical or magnetic disks, dynamic memory and the like. Common forms of a computer-readable medium include, but are not limited to, a floppy disk, a flexible disk, a hard disk, a magnetic tape, other magnetic medium, a CD-ROM, other optical medium, punch cards, paper tape, other physical medium with patterns of holes, a RAM, a ROM, an EPROM, a FLASH-EPROM, or other memory chip or card, a memory stick, and other media from which a computer, a processor or oilier electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

Figure 2:
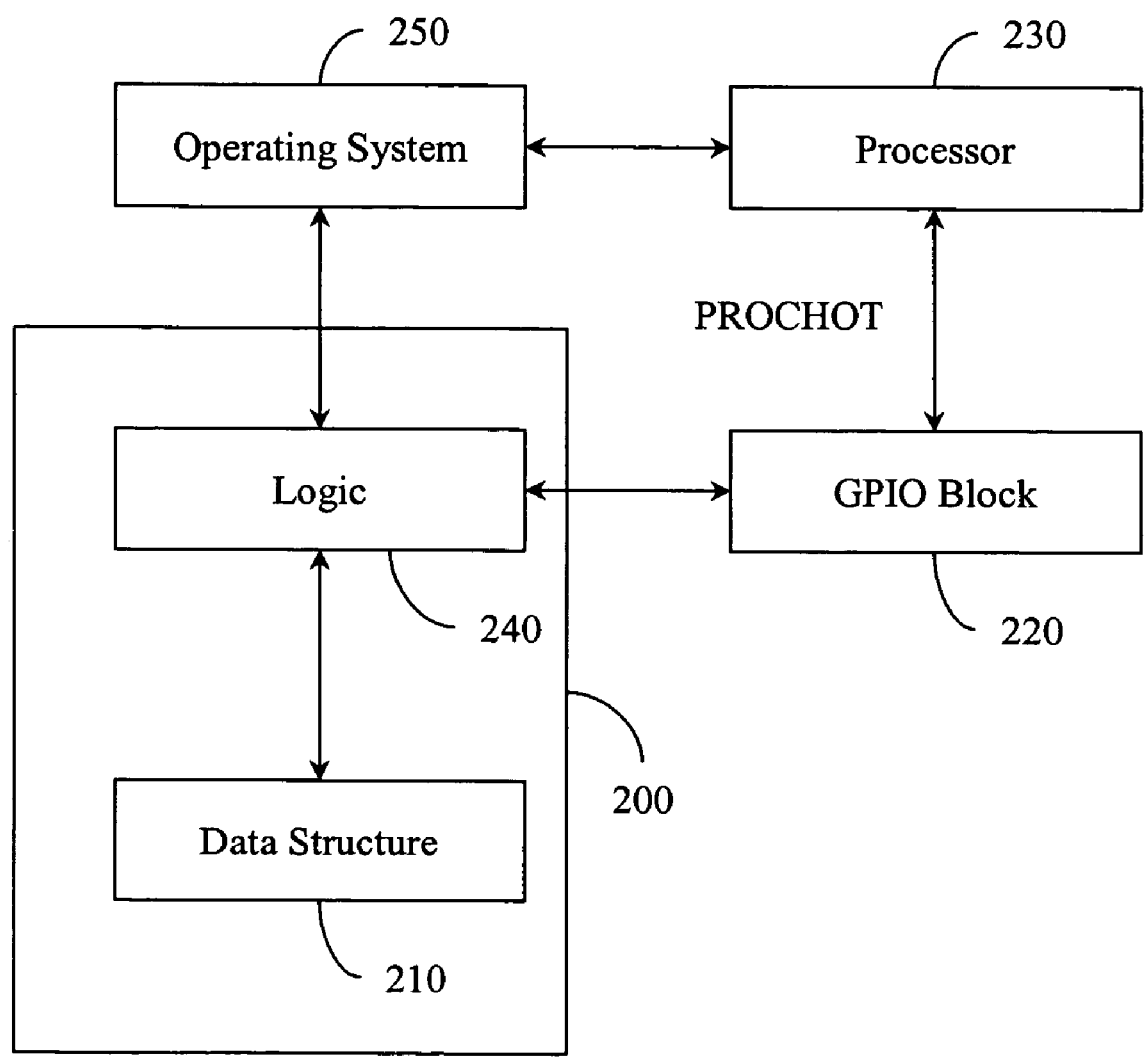
FIG. 2 illustrates an example system for simulating processor performance states using the Pentium microprocessor PROCHOT signal line and TM2 register.

FIG. 2 illustrates an example system 200 for simulating processor performance states using a thermal management register in, and a thermal management signal available to a processor 230. The thermal management register may be, for example, the TM2 register in a Pentium® 4 microprocessor. Similarly, the thermal management signal may be a signal available on the PROCHOT line available to the Pentium® 4 microprocessor. The system 200 may include a data structure 210 stored in a memory and/or data store. The data structure 210 may store the address(es) of a GPIO block 220 and a set of bit patterns that may be written to the GPIO block 220 and/or the thermal management register. In one example, the data structure 210 may also store the address(es) of an ACPI status register(s) (not illustrated) from which a value related to a state established by the GPIQ block 220 can be read.

A bit pattern may be retrieved from the data structure 210 and written to the GPIO block 220. Writing the bit pattern to the GPIO block 220 can cause the processor 230 to have its internal operating frequency and internal operating voltage changed. For example, the GPIO block 220 may receive the bit pattern and, based on the bit pattern, selectively control the PROCHOT signal presented to the processor 230. A first value for the PROCHOT signal may cause the processor 230 to enter a first state (e.g., frequency/voltage combination) while a second signal on the PROCHOT line may cause the processor 230 to enter a second state (e.g., frequency/voltage combination). The frequency and voltage combination established may be controlled, at least in part, by a bit pattern written into the thermal management register (e.g., TM2) in the processor 230. Thus, the system 200 may also facilitate writing a bit pattern from the data structure 210 to the processor 230. To determine whether the desired frequency and voltage have been established, a value may be read from a status register (not illustrated).

The system 200 may also include a logic 240 configured to receive requests from an operating system 250. The request may concern, for example, establishing one of two desired processor performance states in the processor 230. Thus, system 200 may receive the request from the operating system 250 and select a bit pattern from the set of bit patterns stored in the data structure 210 based on the processor performance state requested by the operating system 250. The bit pattern may be retrieved from a look-up table, for example.

The bit pattern may be written to the GPIO block 220 and/or the TM2 register to facilitate simulating a processor performance state. The GPIO block 220 may then cause the PROCHOT signal to be controlled, which may in turn cause the processor 230 to be placed in the desired processor performance state. The operating system 250 may operate like it is establishing a desired processor performance state in the processor 230 by making a request to the logic 240. However, the logic 240 may analyze the request, determine a suitable PROCHOT signal, and select a bit pattern to write to the GPIO block 220 and/or the TM2 register based on the request, where the bit pattern will cause the desired processor performance state to be simulated through the creation of and response to the PROCHOT signal.

In one example, the data structure 210 is stored in a memory that is operably connectable to a Basic Input Output System (BIOS) configured to facilitate controlling a function(s) performed by the processor 230. In another example, the data structure 210 may be an ACPI table stored in a memory that is operably connectable to a BIOS. In yet another example, the data structure 210 may be an ACPI table stored in a BIOS (e.g., a ROM BIOS).

The data structure 210 may store a set of bit patterns and the logic 240 may be configured to select a bit pattern from the data structure based on a request from the operating system 250. For example, a request to enter a lower performance state may lead to a first bit pattern(s) being selected from a set of bit patterns while a request to enter a higher performance state may lead to a second bit pattern(s) being selected from the set of bit patterns. A lower performance state may be produced by causing a first signal (e.g., 5V) to be placed on the PROCHOT line and by a first bit pattern being provided to the TM2 register. A higher performance state may be produced by causing a second signal (e.g.; 0V) to be placed on the PROCHOT line and by a second bit pattern being provided to the TM2 register. Changing the states may include causing the processor to lower its core to bus ratio and operating voltage. Concerning the bit patterns that may be stored, read, and/or processed by the system 200, the bit patterns may control individual bit lines or may be used collectively as patterns. For example, eight bits represented as 0xff (hexadecimal) may be used to control establishing a high processor performance state (e.g., high voltage, high frequency) while eight bits represented as 0x00 (hexadecimal) may be used to control establishing a low processor performance state (e.g., low voltage, low frequency). Similarly, a bit pattern like 0xf0 may signal an intent to toggle a processor performance state from high to low or low to high. While eight bit patterns are described, it is to be appreciated that the bit patterns may be represented by a greater and/or lesser number of bits.

Figure 3:
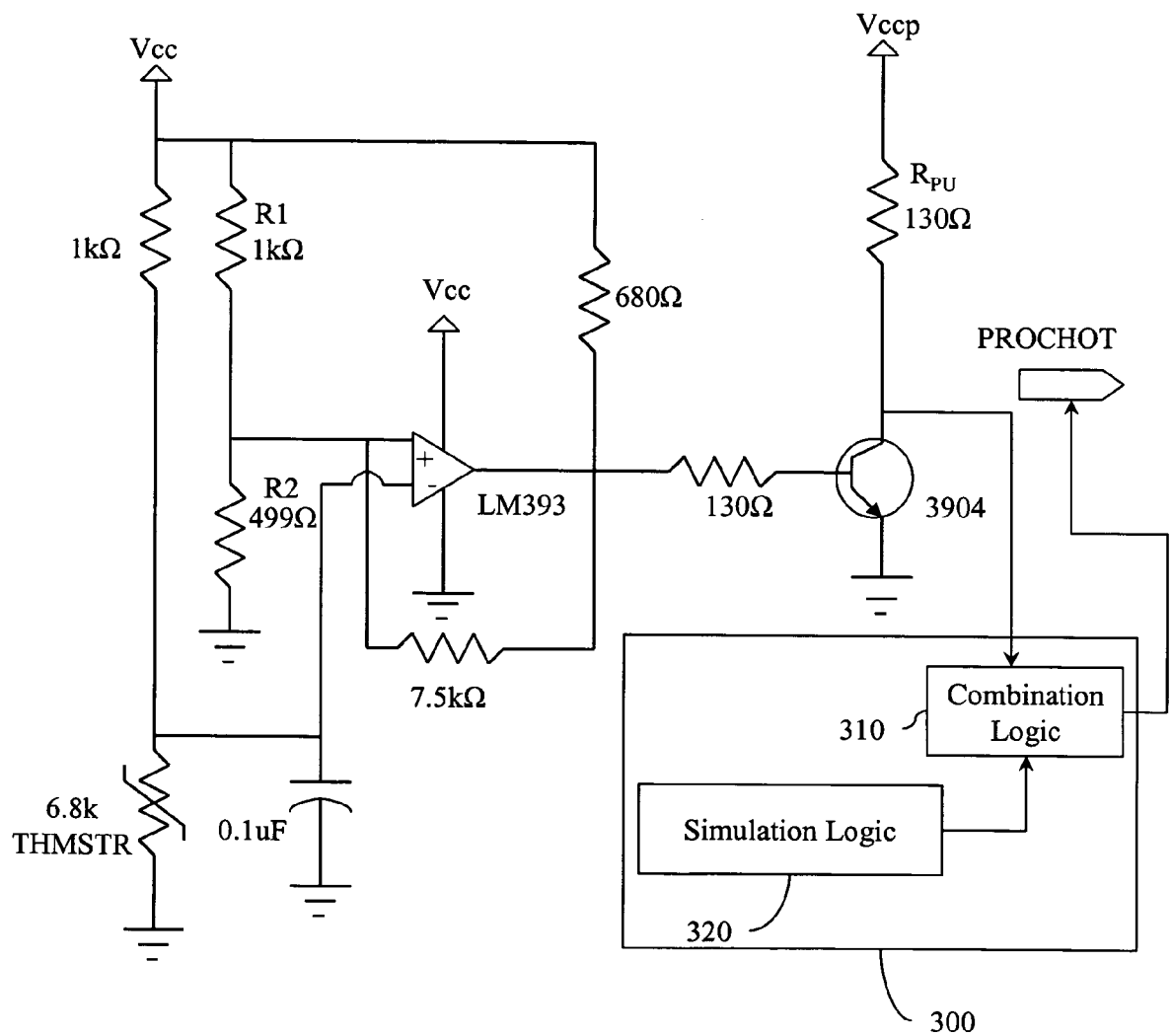
FIG. 3 illustrates an example system for simulating processor performance states using a thermal management line available to, and a thermal management register located in a microprocessor.

FIG. 3 illustrates a thermal management circuit like that illustrated in Prior Art FIG. 1 except the thermal management circuit has been reconfigured so that its output no longer directly connects to the PROCHOT line. The output is now routed to a combination logic 310 that forms part of a system 300 for simulating processor performance states using the PROCHOT signal line and the TM2 register available to a Pentium processor. While the PROCHOT line, the TM2 register, and Pentium processors are described, it is to be appreciated that other logics associated with controlling processor frequency and voltage, other lines associated with reporting thermal conditions, and other processors operably connectable to such logics and lines may be employed.

The system 300 includes a simulation logic 320 configured to receive a request to place a processor in a performance state and in response to receiving the request to cause a signal to be provided to the combination logic 310, where the signal facilitates controlling the PRBCHOT signal line and thus processor frequency and voltage. In one example, the simulation logic 320 may access a data structure that stores a GPIO block address, a thermal management register address, a status register address, bit patterns to write to the GPIO block, and/or bit patterns to match to values read from the status register. The data structure may be stored, for example, in a ROM-BIOS.

The simulation logic 320 may receive a request to place a processor in a performance state. However, the processor may not have performance states implemented. For example, while processors used in laptop systems may have processor performance states available, processors used in desktop systems may not. Therefore, the simulation logic 320 may acquire the address of a GPIO block configured to cause a signal to be provided to the combination logic 310. The simulation logic 320 may write a bit pattern to the GPIO block that causes the GPIO block to provide the signal to the combination logic 310. The combination logic 310 may then in turn cause a signal (e.g., 0V, 5V) to be placed on the PROCHOT line, which may cause a processor to read a frequency/voltage data from a thermal management register (e.g., TM2) and change its operating frequency and voltage accordingly. Thus, the simulation logic 320 can cause the processor to change frequency and voltage and thus simulate processor performance states.

Figure 4:
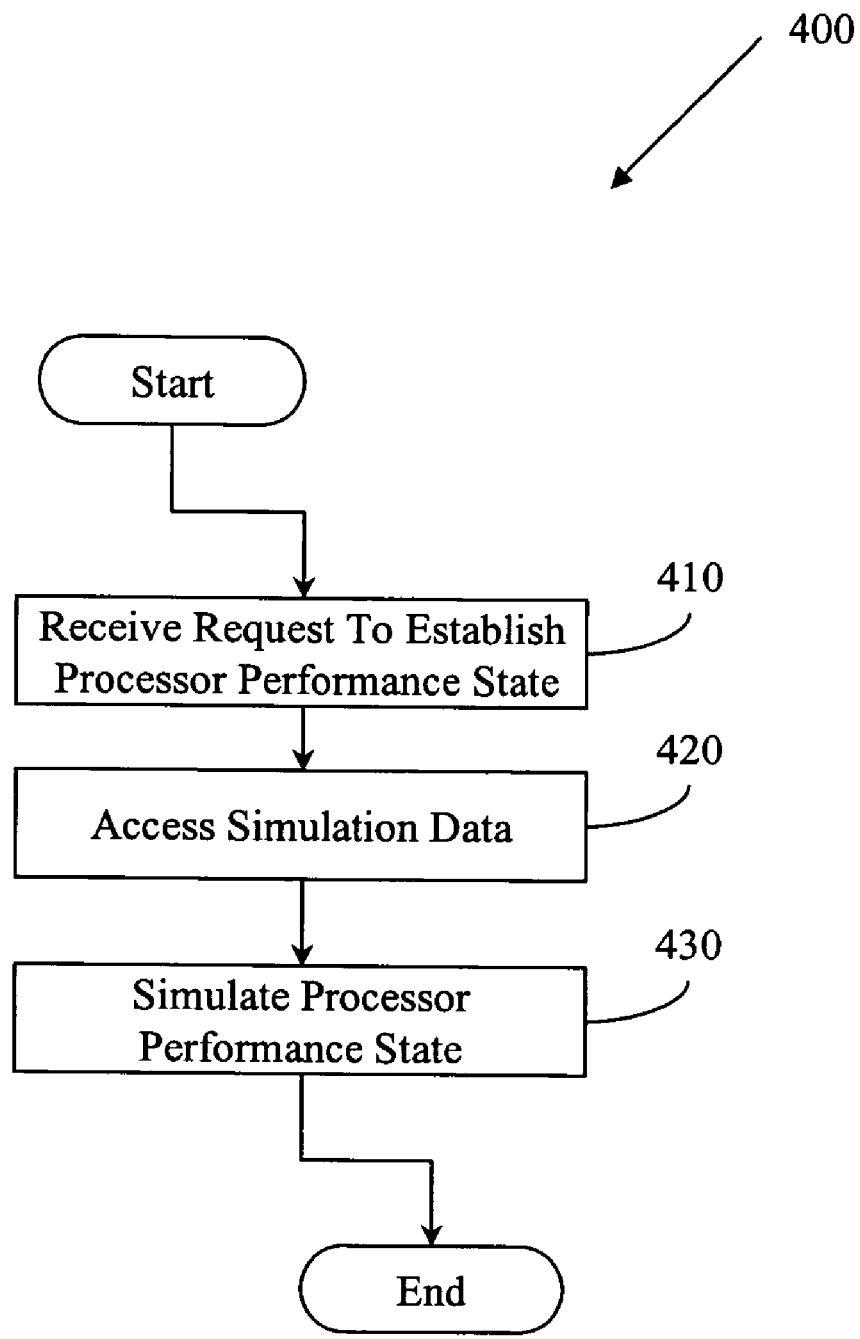
FIG. 4 illustrates an example method for simulating processor performance states using the Pentium microprocessor PROCHOT signal line and TM2register.
Figure 5:
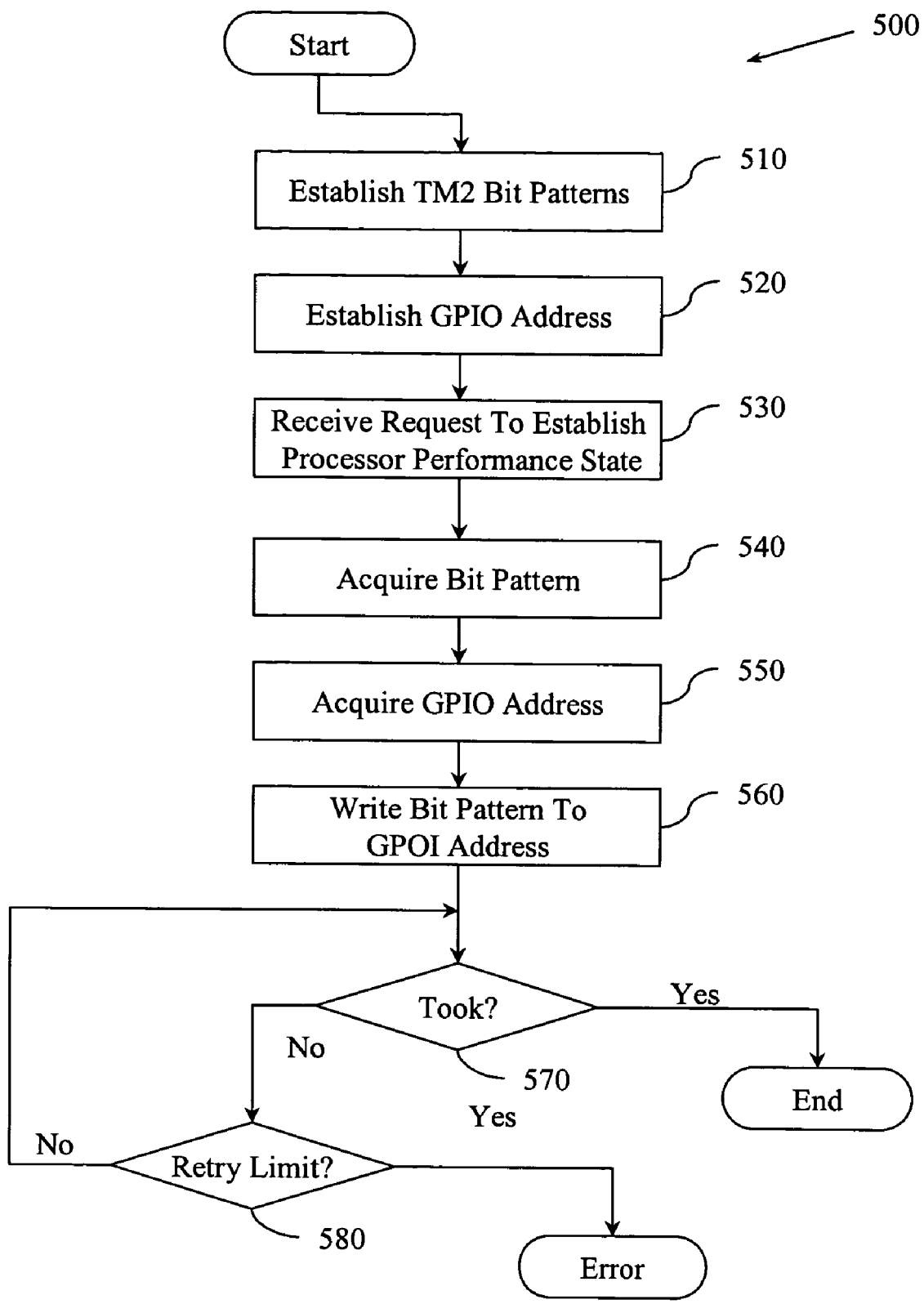
FIG. 5 illustrates an example method for simulating processor performance states using a thermal management line available to, and a thermal management register in a microprocessor.

Example methods may be better appreciated with reference to the flow diagrams of FIGS. 4 and 5. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks.

In the flow diagrams, blocks denote "processing blocks" that may be implemented with logic. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on are not shown. It will be further appreciated that electronic and software applications may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques.

FIG. 4 illustrates an example method 400 for simulating processor performance states using the PROCHOT line and the TM2 register available to a Pentium 4 processor. While the method 400 is described in the context of the TM2 register and the PROCHOT line, it is to be appreciated that other processors configured with processor temperature monitoring and/or controlling circuits, thermal management signals, and thermal management registers may be controlled to simulate process performance states in a similar manner.

The method 400 may include, at 410, receiving a request to establish a processor performance state in a processor. The request may come, for example, from an operating system and/or an application that desires to have the processor set to a desired processor performance state. The request may be generated in response to an action (e.g., choice made from a graphical user interface), to a state (e.g., thermal condition), to an analysis (e.g., predicted CPU utilization), and the like. By way of illustration, an operating system may determine that a first application like a manual data entry application may only require a small amount of a processor's capacity and thus may request a lower processor performance state. By way of further illustration, the operating system may subsequently determine that a second application like a real-time three-dimensional rendering program may require a greater amount of a processor's capacity and thus may request a higher processor performance state.

The method 400 may then proceed, at 420, to access a data store configured to store simulation data. The data store may be accessed to acquire, for example, a bit pattern to write to a GPIO block and/or to the TM2 register. The data store may also be accessed to acquire the address of the GPIO block, the address of the TM2 register, and the like. Thus, rather than the method 400 directly driving an internal clock frequency for a processor and changing an internal operating voltage for a processor by writing to frequency and/or voltage controlling apparatus configured to implement the processor performance state, as might be anticipated by the operating system, a different set of actions like writing a bit pattern to the GPIO block and/or the TM2 register may occur. The operating system may remain unaware that a different set of actions is occurring. Thus the fact that a simulated processor performance state is produced rather than a true processor performance state may be transparent to the operating system. The operating system may even remain unaware that it is interacting with a processor that does not implement processor performance states.

The method 400 may then proceed, at 430, to simulate a processor performance state by writing to the GPIO block and/or the TM2 register and causing the PROCHOT signal to be asserted (e.g., signifying processor is overheating) or deasserted (e.g., signifying processor is not overheating). In one example, the method 400 may facilitate simulating processor performance states that correspond to a higher performance state and a lower performance state.

While FIG. 4 illustrates various actions occurring in serial, it is to be appreciated that various actions illustrated in FIG. 4 could occur substantially in parallel. By way of illustration, a first process could receive requests to establish one of two processor performance states. Similarly, a second process could access data like bit patterns to write to the GPIO block and/or the TM2 register and the address of the GPIO block and/or TM2 register, while a third process could facilitate simulating the desired processor performance state by writing a retrieved bit pattern to the GPIO block and thus causing the PROCHOT signal to be asserted or deasserted. While three processes are described, it is to be appreciated that a greater and/or lesser number of processes could be employed and that lightweight processes, regular processes, threads, and other approaches could be employed.

FIG. 5 illustrates an example method 500 for simulating processor performance states using a thermal management register in, and a thermal management line available to a processor. In one example, the thermal management register is the TM2 register and the thermal management line is the PROCHOT line available to a Pentium processor. The method 500 includes, at 510, establishing a bit pattern(s) in a data store. In one example, the bit pattern(s) may be patterns that can be written to the TM2 register to control the frequency and the voltage a processor is to employ when the signal on the PROCHOT line indicates that the processor is overheating. In another example, the bit pattern(s) may be patterns that can be written to the TM2 register to control the frequency and the voltage a processor is to employ when the signal on the PROCHOT line indicates that the processor is not overheating. In one example, the bit patterns may be placed into the data store when a system is manufactured while in another example the bit patterns may be user-configurable via, for example, a graphical user interface. The bit patterns may be established in a data structure that is stored as an ACPI table in a Basic Input Output System (BIOS) operably connectable to the processor.

The method 500 may also include, at 520, establishing a GPIO block address in the data store. The GPIO block address may be the address of a block to which a bit pattern can be written to facilitate controlling the thermal management line to produce a simulated processor performance state. Additionally, a status register address may be established. The status register address may be the address of a register from which data related to a processor performance state can be read. Thus, in one example, the method 500 may include populating a data structure with a set of bit patterns stored in an ACPI table, writing the address of an ACPI status register to the ACPI table, and writing the address of a GPIO block that facilitates operably controlling the thermal management line.

The method 500 may also include, at 530, receiving a request to establish a processor performance state. The request may come from an operating system, an application, a user, and so on. In one example, the operating system may be Microsoft® Windows® XP. Instead of directly driving an internal processor frequency and an internal processor voltage by writing internal machine specific registers dedicated to implementing processor performance states, the method 500 may instead, at 540, acquire a bit pattern that can be written to the GPIO block and/or the thermal management register. Since ACPI data structures and methods may virtualize a hardware environment, the method 500 may also include, at 550, acquiring an address of the GPIO block to which the bit pattern acquired at 540 can be written. The bit pattern and the GPIO block address may be acquired from the data store configured at 510 and 520, for example. After acquiring the bit pattern and the GP10 block address, the method 500 may, at 560, write the bit pattern to the GPIO block and/or the thermal management register. In one example, writing the bit pattern to the GPIO block causes a signal to be placed on a PROCHOT line into the processor. Placing the signal on the PROCHOT line can cause the processor to change its operating frequency and voltage and thus a processor performance state can be simulated.

The method 500 may also include, at 570, making a determination concerning whether writing the bit pattern to the GPIO block caused the desired processor performance state to be simulated—did the write take? The determination may be made, for example, by reading a status register. Thus, the method 500 may include acquiring an address of a status register (e.g., ACPI status register) configured to report a value(s) (e.g., processor operating frequency, processor operating voltage) related to performance state, reading the value from the status register, and selectively reporting a success or error condition based on the value. If the determination at 570 is Yes, then the method 500 may conclude. In another example, the method 500 may return to 530 and wait for another request to simulate another processor performance state. But if the determination at 570 is No, then another determination may be made at 580 concerning whether a retry limit of status checks has occurred. If the retry limit has been exceeded, an error condition may be reported, otherwise the method 500 may return to 570 for another status check.

While FIG. 5 illustrates various actions occurring in serial, it is to be appreciated that various actions illustrated in FIG. 5 could occur substantially in parallel. By way of illustration, a first process could establish bit patterns and addresses, a second process could receive requests to establish processor performance states, a third process could acquire bit patterns and addresses, a fourth process could write bit patterns, and a fifth process could determine whether the desired processor performance state has been simulated. While five processes are described, it is to be appreciated that a greater and/or lesser number of processes could be employed and that lightweight processes, regular processes, threads, and other approaches could be employed.

In one example, methodologies are implemented as processor executable instructions and/or operations stored on a computer-readable medium. Thus, in one example, a computer-readable medium may store processor executable instructions operable to perform a method that includes receiving a request to establish a processor performance state in a processor, accessing a data store to acquire simulation data that facilitates controlling the state of a thermal management signal and a thermal management register, and causing the processor performance state to be simulated by causing the processor to have its operating frequency and voltage changed in response to writing a bit pattern to the GPIO block. While the above method is described being stored on a computer-readable medium, it is to be appreciated that other example methods described herein can also be stored on a computer-readable medium.

Figure 6:
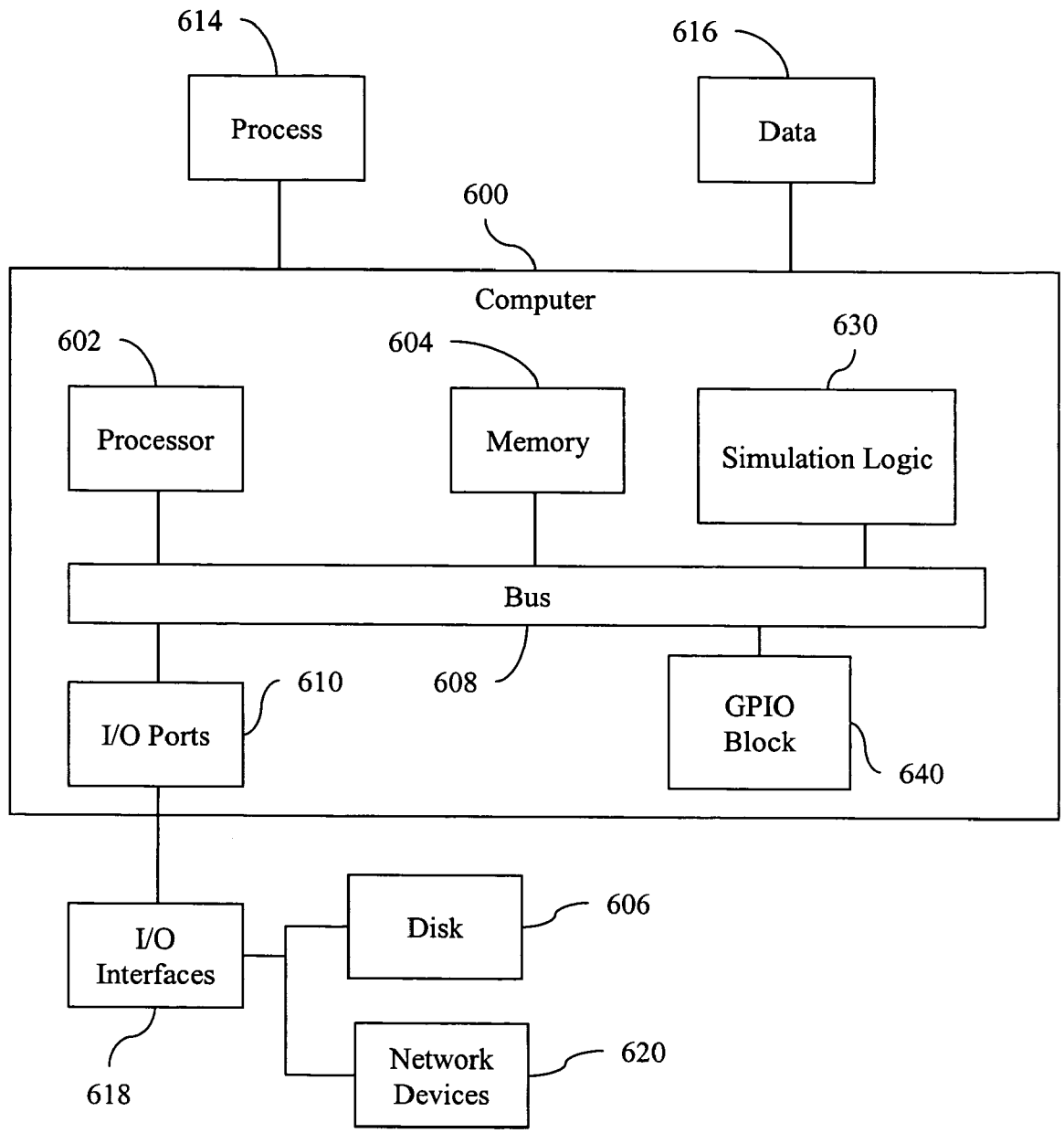
FIG. 6 illustrates an example computing environment in which example systems and methods illustrated herein can operate.

FIG. 6 illustrates a computer 600 that includes a processor 602, a memory 604, and input/output ports 610 operably connected by a bus 608. In one example, the computer 600 may include a simulation logic 630 configured to facilitate using a thermal management line and a thermal management register to simulate processor performance states in the processor 602. The simulation logic 630 may receive a request to place the processor 602 in a performance state. Simulating the performance state for the processor 602 may include manipulating a GPIO block 640, which in turn will manipulate a signal on a thermal management line available to the processor 602. The signal may cause the processor 602 to change its internal operating frequency and voltage, thus simulating a processor performance state.

The processor 602 can be a variety of various processors including dual microprocessor and other multi-processor architectures. The memory 604 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the computer 600 via, for example, an input/output interface (e.g., card, device) 618 and an input/output port 610. The disk 606 can include, but is not limited to, devices like a magnetic disk drive, a solid state disk drive, a floppy disk drive, a tape drive, a Zip drive, a flash memory card, and/or a memory stick. Furthermore, the disk 606 can include optical drives like a CD-ROM, a CD recordable drive (CD-R drive), a CD rewriteable drive (CD-RW drive), and/or a digital video ROM drive (DVD ROM). The memory 604 can store processes 614 and/or data 616, for example. The disk 606 and/or memory 604 can store an operating system that controls and allocates resources of the computer 600.

The bus 608 can be a single internal bus interconnect architecture and/or other bus or mesh architectures. While a single bus is illustrated, it is to be appreciated that computer 600 may communicate with various devices, logics, and peripherals using other busses that are not illustrated (e.g., PCIE, SATA, Infiniband®, 1394, USB, Ethernet). The bus 608 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 600 may interact with input/output devices via i/o interfaces 618 and input/output ports 610. Input/output devices can include, but are not limited to, a keyboard, a microphone, a pointing and selection device, cameras, video cards, displays, disk 606, network devices 620, and the like. The input/output ports 610 can include but are not limited to, serial ports, parallel ports, and USB ports.

The computer 600 can operate in a network environment and thus may be connected to network devices 620 via the i/o devices 618, and/or the i/o ports 610. Through the network devices 620, the computer 600 may interact with a network. Through the network, the computer 600 may be logically connected to remote computers. The networks with which the computer 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth® (IEEE 802.15.1), and the like. Similarly, the network devices 620 can connect to WAN technologies including, but not limited to, point to point links, circuit switching networks like integrated services digital networks (ISDN), packet switching networks, and digital subscriber lines (DSL).

Figure 7:
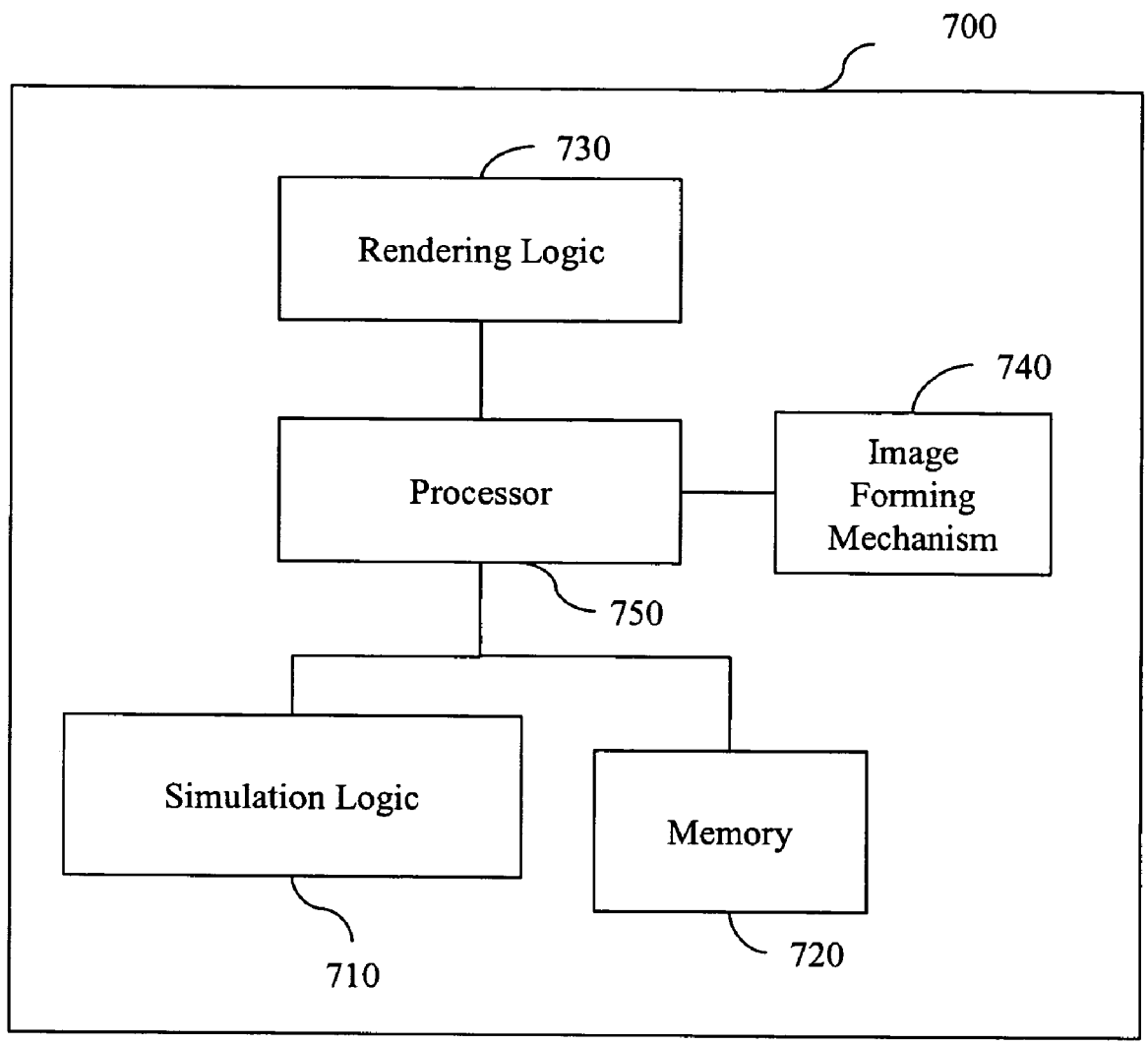
FIG. 7 illustrates an example image forming device in which example systems and methods illustrated herein can operate.

FIG. 7 illustrates an example image forming device 700 (e.g., printer) that includes a simulation logic 710 similar to the example systems described herein. The simulation logic 710 may be configured to perform executable methods like those described herein. The simulation logic 710 may be permanently and/or removably attached to the image forming device 700. In one example, the simulation logic 710 facilitates controlling a signal on a thermal management line (e.g., PROCHOT). Controlling the signal on the thermal management line facilitates controlling an internal operating frequency and voltage of the processor 750 and thus facilitates simulating performance states for the processor 750.

The image forming device 700 may receive print data to be rendered. Thus, image forming device 700 may also include a memory 720 configured to store print data or to be used more generally for image processing. The image forming device 700 may also include a rendering logic 730 configured to generate a printer-ready image from print data. Rendering varies based on the format of the data involved and the type of imaging device. In general, the rendering logic 730 converts high-level data into a graphical image for display or printing (e.g., the print-ready image). For example, one form is ray-tracing that takes a mathematical model of a three-dimensional object or scene and converts it into a bitmap image. Another example is the process of converting HTML into an image for display/printing. It is to be appreciated that the image forming device 700 may receive printer-ready data that does not need to be rendered and thus the rendering logic 730 may not appear in some image forming devices.

The image forming device 700 may also include an image forming mechanism 740 configured to generate an image onto print media from the print-ready image. The image forming mechanism 740 may vary based on the type of the imaging device 700 and may include a laser imaging mechanism, other toner-based imaging mechanisms, an ink jet mechanism, digital imaging mechanism, or other imaging reproduction engine. A processor 750 may be included that is implemented with logic to control the operation of the image-forming device 700. In one example, the processor 750 includes logic that is capable of executing Java® instructions. Other components of the image forming device 700 are not described herein but may include media handling and storage mechanisms, sensors, controllers, and other components involved in the imaging process.

Figure 8:
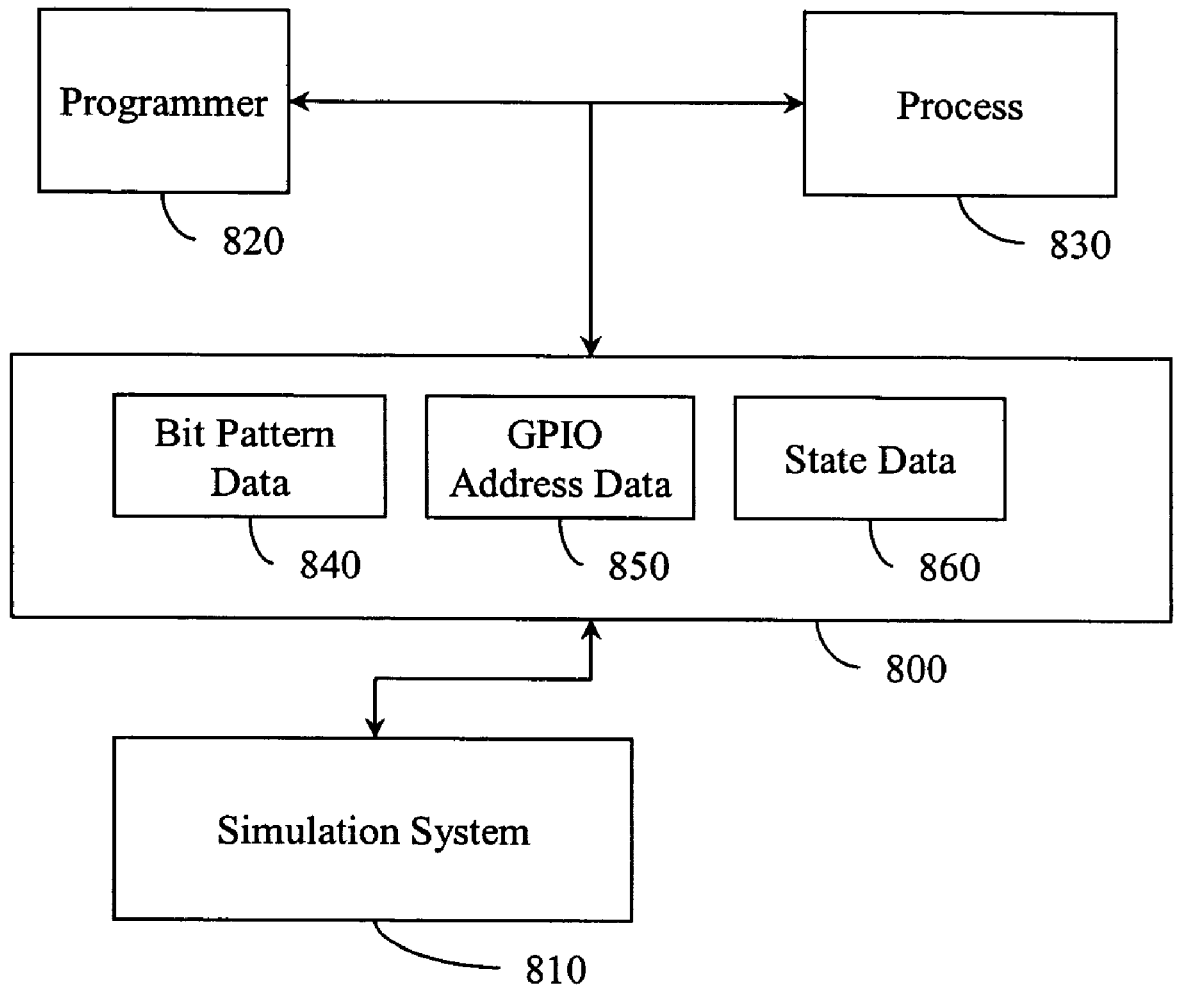
FIG. 8 illustrates an example application programming interface (API).

Referring now to FIG. 8, an application programming interface (API) 800 is illustrated providing access to a system 810 for simulating processor performance states using a thermal management line (e.g., PROCHOT) and a thermal management register (e.g., TM2). The API 800 can be employed, for example, by a programmer 820 and/or a process 830 to gain access to processing performed by the system 810. For example, a programmer 820 can write a program to access (e.g., invoke operation, monitor operation, control operation) the system 810 where writing the program is facilitated by the presence of the API 800. Rather than programmer 820 having to understand the internals of the system 810, the programmer 820 merely has to learn the interface to the system 810. This facilitates encapsulating the functionality of the system 810 while exposing that functionality.

Similarly, the API 800 can be employed to provide data values to the system 810 and/or retrieve data values from the system 810. For example, a process 830 that requests that certain processor performance states be established for a processor may make the requests to the system 810 via the API 800 by, for example, using a call provided in the API 800. Thus, in one example of the API 800, a set of application programming interfaces can be stored on a computer-readable medium. The interfaces can be employed by a programmer, computer component, logic, and so on to gain access to a system 810 that simulates processor performance states by manipulating a thermal management signal on a thermal management line available to a processor. The interfaces can include, but are not limited to, a first interface 840 that communicates a bit pattern data, a second interface 850 that communicates a GPIO address data, and a third interface 860 that communicates a state data that describes a processor performance state simulated by the system 810, where the system 810 used the bit pattern data and the GPIO address data to generate a signal related to a processor thermal condition to cause the processor performance state to be simulated.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A system for proactively simulating a processor performance state in a processor without receiving a processor temperature signal comprising:

a data structure stored in a memory, the date structure being configured to store an address of a GPIO (general purpose input output) block and a set of bit patterns that may be written to the GPIO block, where the GPIO block is configured to control a thermal management signal that can be provided to the processor, and a logic operably connected to the memory, the logic being configured:

to receive a request to establish a desired processor performance state in the processor, where the request is generated in response to a forward looking analysis of a number of instructions per second to be required by the processor, and where the request is received from an operating system that does not have true processor states available;

to select a bit pattern, the bit pattern being selected from the set of bit patterns, and to write the bit pattern to the GPIO (General Purpose Input Output) block to control a frequency and a voltage at which the processor is to operate without performing processor throttling.

2. The system of claim 1, where the memory is operably connectable to a Basic Input Output System (BIOS) configured to facilitate controlling a processor function.

3. The system of claim 1, where the set of bit patterns facilitates simulating two processor performance states that correspond to a higher performance state and a lower performance state.

4. The system of claim 1, where the thermal management signal comprises a signal placed on a control line available to the processor, where the control line is configured to provide a processor hot signal.

5. The system of claim 1 being incorporated into a computer.

6. The system of claim 1 being incorporated into a printer.

7. A system for proactively simulating a processor performance state in a processor that is configured to receive a thermal management signal from an operating system that does not have true processor states available and to selectively change the processor operating frequency and voltage based on the thermal management signal, the system comprising:

a simulation logic configured to produce a simulated thermal management signal, where the simulated thermal management signal is based, at least in part, on a forward looking load determination for the processor, where the simulation logic comprises:

a data structure stored in a memory, the data structure being configured to store an address of a GPIO (General Purpose Input Output) block and a set of bit patterns that may be written to the GPIO block in the processor, where the GPIO block is configured to control the thermal management signal that can be provided to the processor, and a logic operably connected to the memory, the logic configured to receive a request to establish a desired processor performance state in the processor, where the request is generated in response to the forward looking load determination for the processor, to select a bit pattern, the bit pattern being selected from the set of bit patterns, and to write the bit pattern to the GPIQ block, where the bit pattern controls a frequency and a voltage at which the processor will operate without performing processor throttling;

a thermal management circuit configured to produce an actual thermal management signal; and a combination logic configured to selectively provide to the processor one and only one of, the actual thermal management signal or the simulated thermal management signal.

8. A method for proactively simulating a processor performance state for a system that does not have actual processor performance states available, comprising:

receiving a request to establish the processor performance state in a processor, where the request is generated in response to a forward-looking load determination for the processor;

accessing a data store to acquire a set of bit patterns that facilitates controlling a state of a thermal management signal and a thermal management register; and causing the processor performance state to be simulated without cyclic processor throttling by causing the processor to change its operating frequency and operating voltage in response to the thermal management signal produced in response to writing a member of the set of bit patterns to a General Purpose Input Output (GPIO) block, where the operating frequency and operating voltage are maintained without cyclic throttling, and where the member of the set of bit patterns comprises two or more bits.

9. The method of claim 8, where the processor performance state corresponds to one of, a higher performance state, and a lower performance state.

10. The method of claim 8, where the thermal management signal comprises a processor hot signal provided to the processor.

11. A system for proactively simulating a processor performance state in a processor without receiving a processor temperature signal comprising:

a data structure stored in a memory, the data structure being configured to store an address of a thermal management register and a set of bit patterns that may be written to the thermal management register in the processor, where the thermal management register is configured to control a thermal management signal that can be provided to the processor, and a logic operably connected to the memory, the logic being configured:

to receive a request to establish a desired processor performance state in the processor, where the request is generated in response to a forward looking analysis of a number of instructions per second to be required by the processor, and where the request is received from an operating system that does not have true processor states available;

to select a bit pattern, the bit pattern being selected from the set of bit patterns, and to write the bit pattern to the thermal management register to control a frequency and a voltage at which the processor is to operate without performing processor throttling.

* * * * *

UNITED STATES PATENT AND TRADEMARK OFFICE
CERTIFICATE OF CORRECTION

PATENT NO. : 7,430,502 B2
APPLICATION NO. : 10/812147
DATED : September 30, 2008
INVENTOR(S) : Louis B. Hobson It is certified that error appears in the above-identified patent and that said Letters Patent is hereby corrected as shown below:

In column 2, line 50, delete "oilier" and insert -- other --, therefor.

In column 4, line 39, delete "GPIQ" and insert -- GPIO --, therefor.

In column 6, line 1, delete "PRBCHOT" and insert -- PROCHOT --, therefor.

In column 8, line 43, delete "GP10" and insert -- GPIO --, therefor.

In column 11, line 16, delete "arc" and insert -- are --, therefor.

In column 12, line 23, in Claim 1, delete "date" and insert -- data --, therefor.

In column 13, line 15, in Claim 7, delete "GPIQ" and insert -- GPIO --, therefor.

Signed and Sealed this

Third Day of February, 2009

JOHN DOLL
*Acting Director of the United States Patent and Trademark Office*